United States Patent
Mattke et al.

(10) Patent No.: US 12,391,557 B2
(45) Date of Patent: *Aug. 19, 2025

(54) METHOD FOR PRODUCING PHOSGENE

(71) Applicant: BASF SE, Ludwigshafen am Rhein (DE)

(72) Inventors: Torsten Mattke, Ludwigshafen am Rhein (DE); Gerhard Olbert, Ludwigshafen am Rhein (DE); Jochen Gauer, Ludwigshafen am Rhein (DE); Kai Thiele, Antwerp (BE); Koenraad Vandewalle, Antwerp (BE); Jens Ferbitz, Ludwigshafen am Rhein (DE); Peter Van Den Abeel, Antwerp (BE)

(73) Assignee: BASF SE, Ludwigshafen am Rhein (DE)

( * ) Notice: Subject to any disclaimer, the term of this patent is extended or adjusted under 35 U.S.C. 154(b) by 798 days.

This patent is subject to a terminal disclaimer.

(21) Appl. No.: 17/605,737

(22) PCT Filed: Apr. 14, 2020

(86) PCT No.: PCT/EP2020/060433
§ 371 (c)(1),
(2) Date: Oct. 22, 2021

(87) PCT Pub. No.: WO2020/216648
PCT Pub. Date: Oct. 29, 2020

(65) Prior Publication Data
US 2022/0212936 A1 Jul. 7, 2022

(30) Foreign Application Priority Data

Apr. 25, 2019 (EP) .................................... 19171148

(51) Int. Cl.
*C01B 32/80* (2017.01)
*C25B 1/34* (2006.01)
*C25B 15/08* (2006.01)
*C25B 1/46* (2006.01)

(52) U.S. Cl.
CPC ................ *C01B 32/80* (2017.08); *C25B 1/34* (2013.01); *C25B 15/08* (2013.01); *C25B 1/46* (2013.01)

(58) Field of Classification Search
CPC .................................................... C01B 32/80
See application file for complete search history.

(56) References Cited

U.S. PATENT DOCUMENTS

| | | | |
|---|---|---|---|
| 2,724,481 A | 11/1955 | Oswalt | |
| 4,169,773 A | 10/1979 | Lai | |
| 4,231,959 A * | 11/1980 | Obrecht | ................... C01B 32/80 562/847 |
| 4,764,308 A | 8/1988 | Sauer et al. | |
| 5,961,813 A | 10/1999 | Gestermann et al. | |
| 2007/0276154 A1 | 11/2007 | Haas et al. | |
| 2008/0029404 A1 | 2/2008 | Weber et al. | |
| 2012/0199493 A1 | 8/2012 | Krafft et al. | |
| 2013/0072717 A1* | 3/2013 | Olbert | ................... B01J 19/0053 562/847 |
| 2015/0165407 A1* | 6/2015 | Hollmann | ................ B01J 8/067 422/202 |
| 2018/0303060 A1 | 10/2018 | Peeters | |

FOREIGN PATENT DOCUMENTS

| | | |
|---|---|---|
| CN | 101448783 A | 6/2009 |
| EP | 1135329 A1 | 9/2001 |
| EP | 1187808 A1 | 3/2002 |
| EP | 1529033 A1 | 5/2005 |
| EP | 2067742 A1 | 6/2009 |
| EP | 2260124 A1 | 12/2010 |
| JP | 61-040809 A | 2/1986 |
| NL | 2015654 B | 5/2017 |
| PL | 217896 B1 | 8/2014 |
| RU | 2281246 C1 | 8/2006 |
| WO | 00/24672 A1 | 5/2000 |
| WO | 01/00569 A1 | 1/2001 |
| WO | 2003/072237 A1 | 9/2003 |
| WO | 2004/014845 A1 | 2/2004 |
| WO | 2009/118162 A1 | 10/2009 |
| WO | 2010/076208 A1 | 7/2010 |
| WO | 2010/103029 A1 | 9/2010 |
| WO | 2013/157931 A1 | 10/2013 |
| WO | 2015/110353 A1 | 7/2015 |
| WO | 2017/069614 A1 | 4/2017 |

OTHER PUBLICATIONS

Derby et al., "Chapter—Chlorine(IV) Oxide", Inorganic syntheses, Ed. John C. Bailar Jr., vol. 4, Jan. 1, 1953, pp. 152-158.
European Search Report for EP Patent Application No. 19171148.0, Issued on Jan. 30, 2020, 3 pages.
International Preliminary Report on Patentability received for PCT Patent Application No. PCT/EP2020/060433, mailed on Nov. 4, 2021, 26 pages (13 pages of English Translation and 13 pages of Original Document).
Karlsson et al., "Selectivity between Oxygen and Chlorine Evolution in the Chlor-Alkali and Chlorate Processes", Chemical Reviews, vol. 116, Issue 5, Feb. 16, 2016, pp. 2982-3028.
Mitchell et al., "Selection of carbon catalysts for the industrial manufacture of phosgene", Catalysis Science & Technology, vol. 2, Issue 10, Jun. 27, 2012, pp. 2109-2115.

(Continued)

*Primary Examiner* — Stuart L Hendrickson
(74) *Attorney, Agent, or Firm* — Faegre Drinker Biddle & Reath LLP

(57) ABSTRACT

The present invention relates to a process for preparing phosgene by reacting chlorine with carbon monoxide over an activated carbon catalyst, wherein the content of chlorine oxides in the chlorine feed stream is low, to an apparatus for preparation of phosgene and to the use of the phosgene prepared by the process of the invention.

13 Claims, 3 Drawing Sheets

(56) References Cited

OTHER PUBLICATIONS

International Search Report and Written Opinion received for PCT Patent Application No. PCT/EP2020/060433, mailed on Sep. 21, 2020, 32 pages (13 pages of English Translation and 19 pages of Original Document).
Invitation to Pay Additional Fees received for PCT Patent Application No. PCT/EP2020/060433, mailed on Jun. 30, 2020, 10 pages (Original Document Only).

* cited by examiner

METHOD FOR PRODUCING PHOSGENE

CROSS-REFERENCE TO RELATED APPLICATIONS

This application is a national stage application (under 35 U.S.C. § 371) of PCT/EP2020/060433, filed Apr. 14, 2020, which claims benefit of European Application No. 19171148.0, filed Apr. 25, 2019, both of which are incorporated herein by reference in their entirety.

BACKGROUND OF THE INVENTION

The present invention relates to a process for preparing phosgene, wherein the content of chlorine oxides in the chlorine feed is low, to an apparatus for preparation of phosgene and to the use of the phosgene prepared by the process of the invention.

PRIOR ART

Phosgene finds use as reagent or as intermediate in many areas of chemistry, especially for industrial carbonylations. It finds use for production of polyurethanes, polycarbonates, pharmaceutical compounds and agrichemicals. The most important field of use in terms of volume is the preparation of diisocyanates as starting materials for polyurethane production. Particular mention should be made here of tolylene 2,4- and 2,6-diisocyanate (TDI), and the isomers and homologs of diphenylmethane diisocyanate (MDI) and hexamethylene diisocyanate (HDI).

Phosgene is prepared on industrial scale by a catalytic gas phase reaction of carbon monoxide and chlorine. This involves combining carbon monoxide in a stoichiometric excess with chlorine and guiding them over a catalyst. The catalyst used in many cases is activated carbon in the form of fixed catalyst beds. On account of the strong exothermicity of the reaction, primarily shell and tube reactors with activated carbon catalysts present therein are used.

There are various options for optimizing the process of phosgene preparation. For example, the reactor used may itself be improved; secondly, the composition of the reactants is crucial to the quality of the phosgene prepared.

WO 03/072237 describes an improved reactor for preparation of phosgene that enables an elevated specific cross-sectional flow velocity and hence a higher capacity by avoiding the corrosion problems at the catalyst tubes in the deflection region. For this purpose, WO 03/072237 proposes a reactor having a bundle of catalyst tubes arranged parallel to one another in longitudinal reactor direction, secured in tube plates at their ends, each with a hood at either end of the reactor and with deflecting plates disposed in the interspace between the catalyst tubes at right angles to longitudinal direction that leave alternately opposite passage openings clear at the inner reactor wall, wherein the catalyst tubes are filled with the solid-state catalyst, the gaseous reaction mixture is guided from one end of the reactor via the hood through the catalyst tubes and drawn off from the opposite end of the reactor by the second hood, and a liquid heat carrier is guided through the interspace around the catalyst tubes, and wherein the reactor has no tubes in the region of the passage openings.

WO 2010/076208 proposes a reactor for preparation of phosgene that can be operated with a high phosgene load and nevertheless ensures adequate cooling, including of the catalyst tubes in the central region of the reactor. What is described is a reactor in which a multitude of catalyst tubes arranged parallel to one another in longitudinal direction of the reactor is provided, welded into a tube plate at either end, with supply of the reactants at the upper end of the catalyst tubes and discharge of the gaseous reaction mixture at the lower end of the catalyst tubes, in each case via a hood, and with feed and drain devices for a liquid heat carrier in the shell space between the catalyst tubes, wherein the flow of the heat carrier in the shell space between the catalyst tubes is guided in a meandering manner by means of deflecting plates, wherein each deflecting plate leaves two mutually opposite circular segment-shaped passage openings clear at the inner reactor wall and the deflecting plate that follows immediately thereafter in each case leaves a central passage opening clear which is bounded by two straight lines that are parallel to and equidistant relative to one another and relative to a reactor diameter, and wherein the reactor has no tubes in the region of the circular segment-shaped passage openings and in the region of the central passage openings. The reactor is characterized in that the multitude of catalyst tubes aligned parallel to one another in longitudinal direction of the reactor are arranged in two identical bundles of catalyst tubes separated from one another by a region free of catalyst tubes that extends to either side along the diameter of the reactor, and in that the coefficient of heat transfer at the interface between the catalyst tubes and the heat carrier is balanced out over every reactor cross section by fitting the flow pathways of the heat carrier in every reactor cross section, measured in each case from the first to the last catalyst tube in flow direction of the heat carrier, to one another by an altered arrangement of the catalyst tubes.

The reactors described in WO 03/072237 and WO 2010/076208 assure cooling even in the case of a high phosgene load. This in turn has the effect that corrosion is prevented or at least slowed.

For the preparation of phosgene, for reasons of plant safety and for reasons of product quality, high demands are made on the purity of the carbon monoxide and chlorine feedstocks. The feedstocks should have, for example, low contents of methane and hydrogen since these can lead to a strongly exothermic reaction during the combination with chlorine. This rise in temperature can lead to a hazardous reaction between chlorine and the apparatus material, called a chlorine-iron fire.

The feedstocks should also have low contents of sulfur, bromine and iodine since these can remain in the phosgene produced, and can lead to losses of quality when the phosgene is used in a downstream process, for example the preparation of isocyanates. Such losses of quality are, for example, a poorer color of the end product. The prior art discloses processes for preparing phosgene having a low content of by-products. For example, a suitable process regime achieves contents of less than 150 ppm of carbon tetrachloride (EP 1 135 329), or chlorine comprising less than 50 ppm (EP 118 78 08) or less than 400 ppm (EP 152 90 33) of free or bound bromine or iodine is required.

In order to keep the chlorine content of the phosgene produce as low as possible, carbon monoxide is firstly used in excess, and the phosgene formation reaction is secondly implemented at minimum temperatures.

In the preparation of phosgene, therefore, carbon monoxide is used with an excess relative to chlorine of 0.1 to 50 mol % of the amount needed in stoichiometric terms. The carbon monoxide used in excess cannot be recycled and constitutes a material loss. For instance, E 2 067 742 discloses a process for preparing phosgene with reduced CO emission or reduced CO losses via a main purification, a subsequent condensation of the phosgene and a subsequent recombination of the residual gas with chlorine. A process with a closed-loop control concept for minimization of the CO excess is presented by WO 2010/103029.

However, studies have shown that elevated amounts of chlorine that get into the product stream can arise during the startup and shutdown period.

For instance, WO 2015/110353 describes a process for preparing phosgene that permits the production of phosgene with a low content of chlorine even in the startup period. It is said to be possible to produce phosgene having a chlorine content of not more than 100 ppm by volume at the exit from the phosgene generator.

A further means of optimizing the process for phosgene preparation is to prolong the onstream time of the catalyst.

The catalyst used for industrial purposes is preferably activated carbon, with the selection of a suitable activated carbon being made empirically to the present day (Mitchell et al.: Selection of carbon catalysts for the industrial manufacture of phosgene; Catal. Sci. Technol., 2012, 2, 2109-2115). The activity of the catalyst decreases during phosgene preparation, and the catalyst becomes spent with time. After a certain operating time, the catalyst has to be replaced, which is associated with a shutdown of the phosgene plant and any downstream plants, resulting in production outages.

The causes of premature catalyst deactivation have not yet been entirely clarified. It is assumed that reactions of the activated carbon with impurities in the reactant stream can lead to deactivation of the catalyst. For example, an altered pore size distribution of the catalyst is observed when the activated carbon comes into contact with traces of oxygen from the chlorine used (see Mitchell et al.: Selection of carbon catalysts for the industrial manufacture of phosgene; Catal. Sci. Technol., 2012, 2, 2109-2115.).

Oxygen impurities are introduced into the process via the chlorine feed stream in particular. More particularly, these impurities occur in the preparation of chlorine by chlor-alkali electrolysis.

Cornell et al., Chemical Review, p. 2982, 2016, describe the selectivity between evolution of oxygen and chlorine in chlor-alkali electrolysis. Chloride ($Cl^-$), hypochlorous acid (HOCl), hypochlorite ($ClO^-$) and chlorate ($ClO_3^-$) play a role in chlor-alkali electrolysis. The chlorine-water equilibrium in aqueous solution is very complex, and a number of gaseous substances such as the chlorine oxides can also form in the preparation of chlorine. Chlorine oxides form not just during the preparation of chlorine itself, but also through further reaction of by-products in the preparation of chlorine. For example, sodium chlorite ($NaClO_2$), which is unwanted in the preparation of chlorine, can react with chlorine to give chlorine dioxide ($ClO_2$). Moreover, chlorate that occurs in the brine can react to give chlorine oxides. Sodium chlorate ($NaClO_3$) can also release $ClO_2$ under acidic conditions.

It has now been found that chlorine oxides have a particularly strong deactivating effect on the activated carbon catalyst used in the preparation of phosgene. The deactivating effect of chlorine oxides is much greater than that of pure oxygen and chlorine. Moreover, the deactivating effect sets in even at low temperatures.

It is an object of the present invention to provide a process for preparing phosgene in which the chlorine feed stream does not comprise any chlorine oxides or has been depleted of chlorine oxides.

It has been found that, surprisingly, this object is achieved by the process of the invention, the apparatus for preparation of phosgene, and the use of the phosgene prepared by the process of the invention.

The use of chlorine feed streams having a maximum chlorine oxide content of 130 ppm by volume prevents the deactivation of the catalyst in the preparation of phosgene. This results in an extension of the service life of the activated carbon catalyst.

SUMMARY OF THE INVENTION

The invention firstly provides a process for preparing phosgene in which
a) a chlorine feed stream having a content of chlorine oxides of not more than 130 ppm by volume is provided, wherein
  i) chlorine is prepared by electrolyzing an aqueous solution of sodium chloride under conditions under which chlorine is obtained with a chlorine oxide content of not more than 130 ppm by volume, or
  ii) chlorine having a chlorine oxide of more than 130 ppm by volume is subjected to a workup by which the content of chlorine oxides is reduced to a value of not more than 130 ppm by volume, or
  iii) a first chlorine gas stream having a chlorine oxide content of more than 130 ppm by volume is mixed with a second chlorine gas stream having a chlorine oxide content of less than 130 ppm by volume in such a ratio as to result in a chlorine feed stream having a content of chlorine oxides of not more than 130 ppm by volume, or
  iv) the chlorine is prepared by using a process other than the electrolysis of an aqueous solution of sodium chloride in which chlorine with a chlorine oxide content of not more than 130 ppm by volume is obtained,
b) the chlorine feed stream provided in step a) is subjected to a catalytic reaction with carbon monoxide over an activated carbon catalyst in at least one reactor.

The invention further provides an apparatus for preparation of phosgene, comprising:
a unit for reducing the chlorine oxide content in a chlorine oxide-containing chlorine feed stream having an inlet for the chlorine feed stream and an outlet for the chlorine oxide-depleted chlorine feed stream and
a shell and tube reactor with reactor tubes containing an activated carbon catalyst bed, wherein the shell and tube reactor has an inlet for the chlorine oxide-depleted chlorine feed stream and an outlet for a phosgene-containing product stream, wherein the chlorine oxide-depleted chlorine feed stream is mixed with a carbon monoxide feed stream before entering the shell and tube reactor.

The invention further provides a process for preparing phosgene as defined above and hereinafter which is performed in an apparatus comprising
a unit for reducing the chlorine oxide content in a chlorine oxide-containing chlorine feed stream having an inlet for the chlorine feed stream and an outlet for the chlorine oxide-depleted chlorine feed stream and
a shell and tube reactor with reactor tubes containing an activated carbon catalyst bed, wherein the shell and tube reactor has an inlet for the chlorine oxide-depleted chlorine feed stream and an outlet for a phosgene-containing product stream, wherein the chlorine oxide-depleted chlorine feed stream is mixed with a carbon monoxide feed stream before entering the shell and tube reactor, wherein the chlorine oxide content in the chlorine feed stream is determined and the temperature of the chlorine feed stream is controlled as a function of the chlorine oxide content such that the content of chlorine oxides at the inlet into the phosgene reactor is not more than 130 ppm by volume.

The invention further provides for the use of the phosgene prepared by the process described above and hereinafter for preparation of isocyanates.

PREFERRED EMBODIMENTS OF THE INVENTION

The invention encompasses the following preferred embodiments:

1. A process for preparing phosgene, in which
   a) a chlorine feed stream having a content of chlorine oxides of not more than 130 ppm by volume is provided, wherein
      i) chlorine is prepared by electrolyzing an aqueous solution of sodium chloride under conditions under which chlorine is obtained with a chlorine oxide content of not more than 130 ppm by volume, or
      ii) chlorine having a chlorine oxide of more than 130 ppm by volume is subjected to a workup by which the content of chlorine oxides is reduced to a value of not more than 130 ppm by volume, or
      iii) a first chlorine gas stream having a chlorine oxide content of more than 130 ppm by volume is mixed with a second chlorine gas stream having a chlorine oxide content of less than 130 ppm by volume in such a ratio as to result in a chlorine feed stream having a content of chlorine oxides of not more than 130 ppm by volume, or
      iv) the chlorine is prepared by using a process other than the electrolysis of an aqueous solution of sodium chloride in which chlorine with a chlorine oxide content of not more than 130 ppm by volume is obtained,
   b) the chlorine feed stream provided in step a) is subjected to a catalytic reaction with carbon monoxide over an activated carbon catalyst in at least one reactor.
2. The process according to embodiment 1, wherein, in step i),
   i1) an aqueous stream having a reduced sodium chloride content and an elevated sodium chlorate content compared to the aqueous sodium chloride solution supplied to the anode chamber is withdrawn from the anode chamber of the electrolysis cell used for electrolysis of the aqueous sodium chloride solution,
   i2) the aqueous stream withdrawn from the anode chamber is partly or fully discharged, and/or at least a portion of the sodium chlorate present is removed from the aqueous stream withdrawn from the anode chamber,
   i3) the sodium chloride content of the portion of the aqueous stream withdrawn from the anode chamber that was not discharged in step i2) is increased and it is recycled into the anode chamber.
3. The process according to embodiment 2, wherein, in step i2), at least a portion of the sodium chlorate present in the aqueous stream withdrawn from the anode chamber is removed by admixing the stream with acid.
4. The process according to embodiment 2 or 3, wherein at least a portion of the aqueous stream withdrawn from the anode chamber is subjected to a treatment to reduce the content of chlorine oxides present therein, preferably by UV irradiation.
5. The process according to embodiment 1, wherein, in step ii), the chlorine, for workup, is subjected to a thermal, chemical or catalytic treatment, especially a photochemical treatment, to obtain a chlorine feed stream having a content of chlorine oxides of not more than 130 ppm by volume.
6. The process according to embodiment 1, wherein chlorine prepared by HCl electrolysis, Deacon process or the KEL chlorine process is used as second chlorine gas stream in step iii), or wherein chlorine prepared by HCl electrolysis, Deacon process or the KEL chlorine process is used in step iv).
7. The process according to any of the preceding embodiments, wherein the chlorine oxide comprises chlorine dioxide or consists of chlorine dioxide.
8. The process according to any of the preceding embodiments, wherein the phosgene synthesis is conducted in at least one shell and tube reactor with activated carbon catalyst present in the tubes thereof.
9. The process according to any of the preceding embodiments, wherein the phosgene synthesis is conducted at a stoichiometric excess of carbon monoxide to chlorine of 0.1 to 50 mol %.
10. The process according to any of the preceding embodiments, wherein the phosgene synthesis is effected at an absolute pressure in the range from 0.5 to 20 bar.
11. The process according to any of the preceding embodiments, wherein the phosgene synthesis is effected in at least one shell and tube reactor, and the reactor tubes are cooled by contacting with a liquid heat carrier or by means of evaporative cooling.
12. The process according to embodiment 11, wherein cooling is effected using a liquid heat carrier which is guided in cocurrent or in countercurrent to the flow direction of the gases reacting in the reactor tubes.
13. The process according to embodiment 11, wherein the shell and tube reactor has a shell space through which the heat carrier flows, and the shell space is divided into at least two zones that are supplied separately with liquid or boiling heat carrier for cooling.
14. The process according to any of the preceding embodiments, wherein the reaction gases flow through the at least one reactor vertically from the top downward or from the bottom upward.
15. The process according to any of embodiments 11 to 14, wherein the temperature of the heat carrier is in the range from 10 to 300° C.
16. The process according to any of the preceding embodiments, wherein the activated carbon catalyst used is produced by pyrolysis of a natural raw material.
17. The process according to any of the preceding embodiments, wherein the activated carbon catalyst is in the form of spheres, cylindrical strands, platelets or rings.
18. An apparatus for preparation of phosgene, comprising:
    a unit for reducing the chlorine oxide content in a chlorine oxide-containing chlorine feed stream having an inlet for the chlorine feed stream and an outlet for the chlorine oxide-depleted chlorine feed stream, and a shell and tube reactor with reactor tubes containing an activated carbon catalyst bed, wherein the shell and tube reactor has an inlet for the chlorine oxide-depleted chlorine feed stream and an outlet for a phosgene-containing product stream, wherein the chlorine oxide-depleted chlorine feed stream is mixed with a carbon monoxide feed stream before entering the shell and tube reactor.

19. A process for preparing phosgene as defined in any of embodiments 1 to 17 which is conducted in an apparatus as defined in embodiment 18, wherein the chlorine oxide content in the chlorine feed stream is determined and the temperature of the chlorine feed stream is controlled as a function of the chlorine oxide content such that the content of chlorine oxides at the inlet to the phosgene reactor is not more than 130 ppm by volume.

20. The use of the phosgene prepared by the process according to any of embodiments 1 to 17 for preparation of isocyanates.

DESCRIPTION OF THE INVENTION

In principle, phosgene is prepared by reaction of chlorine with CO in the presence of an activated carbon catalyst by processes known per se from the prior art. WO 2010/103029, WO 2015/110353, WO 2010/076208 and WO 03/072237 are mentioned by way of example, to which reference is made here.

Brine in the context of the present invention is an aqueous solution of NaCl-containing salts that comprises at least 14 g of dissolved salts per 1 kg of water. This may be a mixture of mainly NaCl with various other salts, or the brine may consist solely of NaCl.

In the context of the present invention, the unit "ppm by volume" means parts per million by volume and relates to a temperature of 298.15 K and a pressure of 1013 hPa. The concentration of chlorine oxides by volume in the chlorine feed streams can be determined, for example, by spectrometry via IR measurement, by gas chromatography or by wet-chemical methods as described in Derby et al., Inorganic syntheses, vol. IV, p. 152, 1953, by titration methods. The determination of the chlorine oxide content in the chlorine feed stream by spectrometry or gas chromatography can be measured either offline or online. Particular preference is given to online measurement. In the context of the invention, "online measurement" refers to a measurement where the data are measured directly at the site of their origin, effectively in real time. In spectrometric online measurement, no extractive sampling is required.

The unit standard cubic meter relates to that amount of gas that would take up a gas volume of one cubic metre under fixed conditions (temperature, pressure, air humidity). In the context of the present invention, the standard cubic meter is based on a pressure of 1013.25 hPa, an air humidity of 0% (dry gas) and a temperature of 273.15 K ($t_n$=0° C.) (standard conditions according to DIN 1343, STPD).

Step a):

According to the invention, the chlorine feed stream used for preparation of phosgene has a content of chlorine oxides of not more than 130 ppm by volume. This measure can be satisfied by one of the four measures i)-iv) described hereinafter.

Measure i)

In a first variant of the process of the invention, chlorine is prepared by electrolyzing an aqueous solution of sodium chloride under conditions under which the chlorine is obtained with a chlorine oxide content of not more than 130 ppm by volume. The electrolysis of an aqueous solution of sodium chloride is also referred to hereinafter as chlor-alkali electrolysis.

The starting material for chlor-alkali electrolysis is an aqueous sodium chloride solution, called the "brine". Sodium hydroxide solution, chlorine and hydrogen are produced therefrom in various electrochemical methods that differ in the construction of the electrolysis cell.

The aqueous sodium chloride solution used in the process of the invention preferably comprises 50 to 400 g of NaCl, more preferably 10 to 350 g of NaCl, per kg of aqueous sodium chloride solution.

Suitable designs for chlor-alkali electrolysis are, for example, the diaphragm method, the membrane method, the amalgam method, and electrolysis using an oxygen-depolarized cathode.

In the diaphragm method, the mixing of the reaction products from cathode space and anode space is prevented by a porous diaphragm. The cathode consists, for example, of steel or nickel-coated steel, and the anode of titanium coated with ruthenium(IV) oxide. One disadvantage of the diaphragm method is that the sodium hydroxide solution obtained still has a high proportion of sodium chloride.

In order to avoid drawbacks of the diaphragm method, the membrane method was developed. In the membrane method, a special membrane replaces the diaphragm, and the circulation of brine takes place within the anode space only. Specifically, it is possible to use a titanium anode and a nickel cathode, for example. The membrane used may, for example, be a chlorine-resistant cation exchange membrane of thickness about 0.1 mm, consisting of polytetrafluoroethylene (PTFE/Teflon) with negatively charged $SO_3$ radicals. Suitable membranes are commercially available under the Nafion® name.

In the amalgam method, the anode consists, for example, of ruthenium-coated titanium plates in a horizontal arrangement and provided with bores for passage of chlorine. Chloride ions are oxidized therein to elemental chlorine. The cathode used is liquid mercury, which flows in the same direction as the brine above it at the base of the cell. The sodium formed in the electrolysis forms an NaHg amalgam with the mercury. The amalgam is then broken down catalytically with water, forming sodium hydroxide and hydrogen. The remaining mercury is recycled into the process.

In the preparation of chlorine with an oxygen-depolarized cathode (ODC), the electrolysis cell used is in principle the same as in the membrane method, except that the cathode has a specific oxygen diffusion surface. Oxygen is introduced beyond the latter. The oxygen is reduced together with water to give hydroxide ions.

What is common to all chlor-alkali processes is that chlorine is formed from the chloride anions at the anode and is discharged as product. In the diaphragm method and membrane method hydrogen is formed directly at the cathode, in the amalgam method it is sodium amalgam that is first formed and is broken down catalytically with water to give hydrogen, and when an oxygen-depolarized electrode is used hydroxide ions are formed from oxygen reduced with water, and there is no reduction of protons from autocatalysis to give hydrogen gas. The electrode reactions can be described as follows:

Anode: $2Cl^- \rightarrow Cl_2 + 2e^-$

Cathode: $2H_2O + 2e^- \rightarrow H_2 + 2OH^-$

In aqueous solutions of chlorine gas, complex further reactions can occur, where the reaction products depend on the other species present in the solution and the reaction conditions. A crucial role is played here especially by the pH, i.e. the concentration of hydroxide ions. According to variant i) of the process of the invention, the formation of chlorate ions in the anode chamber is especially to be avoided since chlorate ions are a possible by-product of the formation of chlorine oxides, specifically of chlorine dioxide.

In the preparation of chlorine by electrolysis of an aqueous solution of sodium chloride, specifically in the membrane method and in the diaphragm method, hydroxide ions can pass through the dividing wall that separates the cathode space and anode space from one another. In this case, there may be further reactions for disproportionation of chlorine to chloride and hypochlorite, the latter being able to react further to give chlorate.

1st further reaction: $Cl_2 + OH^- \rightarrow ClO^- + Cl^- + H^+$

2nd further reaction: $3ClO^- \rightarrow ClO_3^- + 2Cl^-$

Hypochlorite can also react further to give oxygen, which may then likewise be involved in the formation of chlorine oxides: $2\ OCl^- \rightarrow 2\ Cl^- + O_2$ Oxygen is also formed when water is oxidized at the anode in addition to the formation of chlorine: $H_2O \rightarrow \frac{1}{2} O_2 + 2\ H^+ + 2e^-$ In a suitable embodiment, in step i) of the process of the invention, an acid is added to the aqueous sodium chloride solution in the anode space. The addition of acid to the anode space can be effected together with the feed stream for the aqueous sodium chloride solution or separately therefrom. A preferred acid is HCl. In the addition of acid to the anode space, it should be noted that chlorate already formed at excessively high acid concentration or excessively low pH can react further to give chlorine dioxide, which is undesirable. It may be advantageous here to regularly determine the chlorate concentration in the aqueous solution in the anion space and to control the addition of the acid to the anode space as a function thereof.

In a preferred embodiment of variant i), the aqueous sodium chloride solution (brine) converted in the anode chamber is circulated in order to replace the sodium chloride consumed by the electrolysis. In this case, the aqueous stream withdrawn from the anode chamber comprises the sodium chlorate formed as a by-product. In order to prevent enrichment of the sodium chlorate in the anode chamber and the formation of chlorine oxides from the sodium chlorate, it is possible to discharge at least a portion of the aqueous stream withdrawn from the anode chamber. Alternatively or additionally, it is possible to at least partly remove at least a portion of the sodium chlorate present in the aqueous stream withdrawn from the anode chamber.

A preferred embodiment is a process wherein, in step i),
i1) an aqueous stream having a reduced sodium chloride content and an elevated sodium chlorate content compared to the aqueous sodium chloride solution supplied to the anode chamber is withdrawn from the anode chamber of the electrolysis cell used for electrolysis of the aqueous sodium chloride solution,
i2) the aqueous stream withdrawn from the anode chamber is partly or fully discharged, and/or
at least a portion of the sodium chlorate present is removed from the aqueous stream withdrawn from the anode chamber,
i3) the sodium chloride content of the portion of the aqueous stream withdrawn from the anode chamber that was not discharged in step i2) is increased and it is recycled into the anode chamber.

In a simple embodiment of the process of the invention, in step i2), the aqueous stream (anolyte) withdrawn from the anode chamber is partly or fully discharged. The amount discharged is such that the maximum value chosen for the sodium chlorate concentration in the anode chamber is not exceeded. In general, it is sufficient to discharge just a portion of the aqueous stream withdrawn from the anode chamber. The portion that has not been discharged is combined with fresh sodium chloride solution having a higher sodium chloride concentration than the aqueous stream withdrawn from the anode chamber, and the combined aqueous sodium chloride solution is recycled into the anode chamber.

In a preferred embodiment of the process of the invention, in step i2), the aqueous stream (anolyte) withdrawn from the anode chamber is partly or fully subjected to a workup to reduce the sodium chlorate content. In general, it is sufficient to subject just a substream of the aqueous stream withdrawn from the anode chamber to a workup to reduce the sodium chlorate content.

Preferably, in step i2), the anolyte is subjected to a treatment with acid, more preferably HCl, especially concentrated HCl, to reduce the sodium chlorate content. The amount of the strong acid used is chosen such that there is preferably release of $Cl_2$ and NaCl, and the release of $ClO_2$ is avoided. For this purpose, the use of 6 molar equivalents of HCl per mole of sodium chlorate is required. If the sodium chlorate is at least partly broken down by reaction with a smaller excess of the strong acid, for example less than 6 molar equivalents of HCl per mole of sodium chlorate, $ClO_2$ can be released. The following reaction equations show the comproportionation of chlorate with hydrochloric acid to give elemental chlorine, which proceeds only at sufficiently high acid concentration, and the formation of chlorine dioxide in the case of smaller amounts of acid:

$NaClO_3 + 6HCl \rightarrow NaCl + 3Cl_2 + 3H_2O$ $NaClO_3 + 2HCl \rightarrow ClO_2 + \frac{1}{2}Cl_2 + H_2O + NaCl$ If desired, the $Cl_2$ formed here can be combined with the $Cl_2$ formed in the electrolysis. The NaCl formed remains in the brine circuit.

In a suitable execution of the process, the aqueous stream (anolyte) withdrawn from the anode chamber is subjected to dechlorination before its sodium chloride content is increased in step i3) (brine saturation). The anolyte includes further chlorine-containing compounds as well as chlorine, which can be separated therefrom and fed back to the electrolysis. The total amount of dissolved $Cl_2$, $Cl_3^-$, HOCl and $OCl^-$ is also referred to as "active chlorine". The chlorine is bound reversibly in these substances. For dechlorination, it is possible to add a strong acid, preferably HCl, to the anolyte. The pH of the anolyte after addition of HCl is preferably in a range from about 1 to 3, for instance 2. This releases elemental chlorine. The chlorine released can be removed in gaseous form by customary methods, preferably by application of reduced pressure, and fed into the chlorine product stream. In order to remove residues of chlorine still present in the anolyte after the dechlorination under reduced pressure, it can be admixed with sodium sulfite.

Since both the removal of the sodium chlorate in step i2) and the dechlorination can be effected in the presence of a strong acid, specifically HCl, it is advantageous to conduct these steps together. For this purpose, for example, a substream of the aqueous stream withdrawn from the anode chamber can first be admixed with a sufficient amount of HCl for removal of sodium chlorate. In that case, in general, the total amount of acid which is also required for dechlorination is added to the substream. Optionally after additional removal of chlorine oxides, the treated substream thus obtained, for dechlorination, is combined with the remainder of the aqueous stream withdrawn from the anode chamber.

If the removal of the sodium chlorate in step i2) is performed by addition of a strong acid, preferably HCl, the product treated may still comprise chlorine oxides, specifically $ClO_2$. In a specific embodiment of the process of the invention, therefore, at least a portion of the aqueous stream withdrawn from the anode chamber is subjected to a treatment to reduce the content of chlorine oxides present therein. In a suitable execution, the content of chlorine oxides is reduced by UV irradiation. Such a process is described in U.S. Pat. No. 4,169,773, to which reference is made here. The unwanted $ClO_2$ is broken down here to $Cl_2$ and $O_2$.

It is likewise possible to reduce oxygen and chlorate formation through suitable choice of the voltage during the electrolysis to obtain chlorine for the preparation of phosgene.

Measure ii)

In a second variant of the process of the invention, chlorine having a chlorine oxide content of more than 130 ppm by volume is subjected to a workup to reduce the chlorine oxide content to not more than 130 ppm by volume before it is used as chlorine feed stream for preparation of phosgene.

Such a workup may be required, for example, if the measures specified under variant i) cannot be performed on account of the technical configuration of the preparation of chlorine. For example, the equipment used for the chlor-alkali electrolysis may not be available at particular sites. In addition, it may be desirable to use a chlorine contaminated with chlorine oxides from other sources that does not come from the above-described chlor-alkali electrolysis for preparation of phosgene. In that case, the chlorine oxide-containing chlorine feed stream can be subjected to a workup that reduces the content of chlorine oxides to a value of not more than 130 ppm by volume. For this purpose, this chlorine feed stream, before being mixed with CO and/or entry into the phosgene reactor, is subjected to measures that reduce the content of chlorine oxides in the chlorine feed stream to not more than 130 ppm by volume.

In a preferred embodiment, the chlorine dioxide-containing chlorine feed stream is subjected to a thermal, chemical or catalytic cleavage of the chlorine oxides or a combination of two or three of these measures.

In the thermal cleavage, the chlorine oxides are preferably broken down by supply of energy, especially in the form of heat. This breaks the chlorine oxides down into oxygen and chlorine.

Preferably, the thermal cleavage of the chlorine oxide-containing chlorine feed stream is effected by heating the chlorine feed stream to a temperature of preferably at least 45° C.

In the chemical cleavage, the chlorine oxides are converted by a chemical reaction with additives to compounds that are inert in respect of the phosgene synthesis. Preferred additives are, for example, acidic compounds, especially HCl.

In the catalytic cleavage, the chlorine oxides are converted in the presence of a catalyst other than the additives to compounds that are inert in respect of the phosgene synthesis.

Photochemical cleavage of the chlorine oxides is also possible, as described in U.S. Pat. No. 4,169,773.

In a preferred embodiment, the chlorine oxide-containing chlorine feed stream is reduced by thermal or photochemical cleavage to not more than 130 ppm by volume, preferably 0 to 130 ppm by volume.

Measures iii) and iv):

As described above as variant i), it is possible in the preparation of chlorine by electrolysis of an aqueous solution of sodium chloride to provide measures such that the chlorine oxide content of the chlorine obtained is not more than 130 ppm by volume. Alternatively, in a third or fourth variant, it is possible to use a method other than chlor-alkali electrolysis by which it is possible to obtain chlorine having a chlorine oxide content of not more than 130 ppm by volume. In that case, in variant iii), a first chlorine gas stream having a chlorine oxide content of more than 130 ppm by volume may be mixed with a second chlorine gas stream having a chlorine oxide content of less than 130 ppm by volume in such a ratio as to result in a chlorine feed stream having a content of chlorine oxides of not more than 130 ppm by volume. In variant iv), the chlorine is prepared by using a process other than the electrolysis of an aqueous solution of sodium chloride in which chlorine with a chlorine oxide content of not more than 130 ppm by volume is obtained.

Preferably, the process used for preparation of the second chlorine gas stream by variant iii) or that used for preparation of the chlorine by variant iv) is selected from
hydrogen chloride electrolysis,
oxidation of hydrogen chloride with oxygen (Deacon process),
reaction of hydrogen chloride with sulfuric acid and nitrosylsulfuric acid (KEL chlorine process),
oxidation of hydrogen chloride with manganese dioxide (Weldon process).

Preference is given to preparing the second chlorine gas stream according to variant iii) or to preparing chlorine according to variant iv) by a Deacon process or a KEL chlorine process.

In a preferred execution, the second chlorine gas stream is prepared according to variant iii) or chlorine is prepared according to variant iv) by hydrogen chloride electrolysis. Processes and apparatuses for electrolysis of hydrogen chloride gas or hydrogen chloride-containing solutions, especially for hydrochloric acid electrolysis, are known to those skilled in the art. An apparatus for hydrogen chloride electrolysis comprising an oxygen-consuming gas diffusion electrode is described in EP2260124, to which reference is made here.

In a further preferred execution, the second chlorine gas stream is prepared according to variant iii) or chlorine is prepared according to variant iv) by oxidation of hydrogen chloride with oxygen (Deacon process). In the Deacon process, HCl gas is reacted with oxygen (air or pure oxygen) in the presence of a copper catalyst.

In a further preferred execution, the second chlorine gas stream is prepared according to variant iii) or chlorine is prepared according to variant i) by reaction of hydrogen chloride with sulfuric acid and nitrosylsulfuric acid (KEL chlorine process). The crucial reaction step here is the oxidation of hydrogen chloride with nitrogen dioxide, which is released from the nitrosylsulfuric acid in multiple component reactions.

In a further preferred execution, the second chlorine gas stream is prepared according to variant iii) or chlorine is prepared according to variant i) by oxidation of hydrogen chloride with manganese dioxide (Weldon process). In the Weldon process, manganese dioxide is first reacted with hydrochloric acid to evolve chlorine and form manganese (II) chloride. The manganese(II) chloride formed is admixed with limewater, and ingress of air results in formation of calcium manganite that can be recycled back into the process. The calcium manganite formed reacts with HCl to give chlorine gas. The $MnCl_2$ obtained can in turn be recycled, while the $CaCl_2$ obtained as a by-product has to be disposed of.

Particularly suitable chlorine has a chlorine oxide content of 0 to 130 ppm by volume, especially 0 to 100 ppm by volume.

In a preferred embodiment, the chlorine oxides in the chlorine feed stream comprise or consist of chlorine dioxide.

Particularly suitable chlorine has a chlorine dioxide content of 0 to 130 ppm by volume, especially 0 to 100 ppm by volume.

In principle, phosgene is created by reaction of chlorine with CO in the presence of an activated carbon catalyst by processes known per se from the prior art.

Preference is given to using liquid chlorine from a storage vessel, which is evaporated in a heated gasifier and then is freed of any entrained liquid chlorine in a post-evaporator.

Preference is given to effecting the phosgene synthesis of the invention in at least one shell and tube reactor with an activated carbon catalyst present in the tubes thereof.

In a preferred embodiment, the phosgene synthesis of the invention is conducted at a stoichiometric excess of carbon monoxide to chlorine of 0.1 to 50 mol %.

In a further preferred embodiment, the phosgene synthesis of the invention is effected at absolute pressure in the range from 0.5 to 20 bar.

The phosgene synthesis of the invention is preferably effected in at least one shell and tube reactor, and the reactor tubes are cooled by contacting with a liquid heat carrier or by means of evaporative cooling.

In a preferred embodiment, cooling is effected using a liquid heat carrier which is guided in cocurrent or in countercurrent to the flow direction of the gases reacting in the reactor tubes.

In a further preferred embodiment, the shell and tube reactor used for phosgene synthesis has a shell space through which the heat carrier flows, where the shell space is divided into at least two zones that are supplied separately with liquid or boiling heat carrier for cooling.

In a preferred embodiment, the reaction gases flow through the at least one reactor vertically from the top downward or from the bottom upward.

In a further preferred embodiment, the phosgene synthesis of the invention is effected at a temperature of the heat carrier in the range from 10 to 300° C.

In a further preferred embodiment, the catalyst used is activated carbon which is produced by a synthetic route or by pyrolysis of a natural raw material.

The activated carbon catalyst is preferably in the form of spheres, cylindrical strands, platelets or rings.

The invention further provides an apparatus for preparation of phosgene, comprising:
 a unit for reducing the chlorine oxide content in a chlorine oxide-containing chlorine feed stream having an inlet for the chlorine feed stream and an outlet for the chlorine oxide-depleted chlorine feed stream, and
 a shell and tube reactor with reactor tubes containing an activated carbon catalyst bed, wherein the shell and tube reactor has an inlet for the chlorine oxide-depleted chlorine feed stream and an outlet for a phosgene-containing product stream, wherein the chlorine oxide-depleted chlorine feed stream is mixed with a carbon monoxide feed stream before entering the shell and tube reactor and the apparatus is configured for preparation of phosgene, in order to control the chlorine dioxide concentration in the chlorine oxide-depleted chlorine feed stream to not more than 130 ppm by volume.

For this purpose, the chlorine oxide concentration of the chlorine feed stream is detected continuously.

It is possible to detect the actual value of the chlorine oxide concentration in the chlorine feed stream by spectrometry, for example by IR measurement, online GC measurement or titration methods.

In the present context, the parameter to be controlled, the chlorine oxide content in the chlorine feed stream to the reactor, is thus determined continuously, compared with the target value determined for the corresponding state of operation and influenced by approximation to the target value, via the manipulated variable.

If the chlorine oxide content in the chlorine feed stream is greater than 130 ppm by volume, the measures specified under ii) are taken in order to reduce the content of chlorine oxides to a target value of not more than 130 ppm by volume.

In a preferred embodiment, a thermal or photochemical cleavage of the chlorine oxides as set out under ii) is undertaken until the actual value of the content of chlorine oxides corresponds to the target value in the chlorine feed stream.

In a further embodiment of the invention, the phosgene prepared by the process of the invention is used for preparation of isocyanates.

The examples that follow serve to elucidate the invention without restricting it in any way.

EXAMPLES

Experimental Setup

In the examples that follow, the influence of chlorine oxides on the reaction to form phosgene from CO and $Cl_2$ was examined. The chlorine oxide used in the examples was $ClO_2$ (chlorine dioxide), which was prepared by a known process by passage of chlorine gas over sodium chlorite (Derby et al., Inorganic syntheses, vol. IV. p. 152, 1953).

Figure 1:
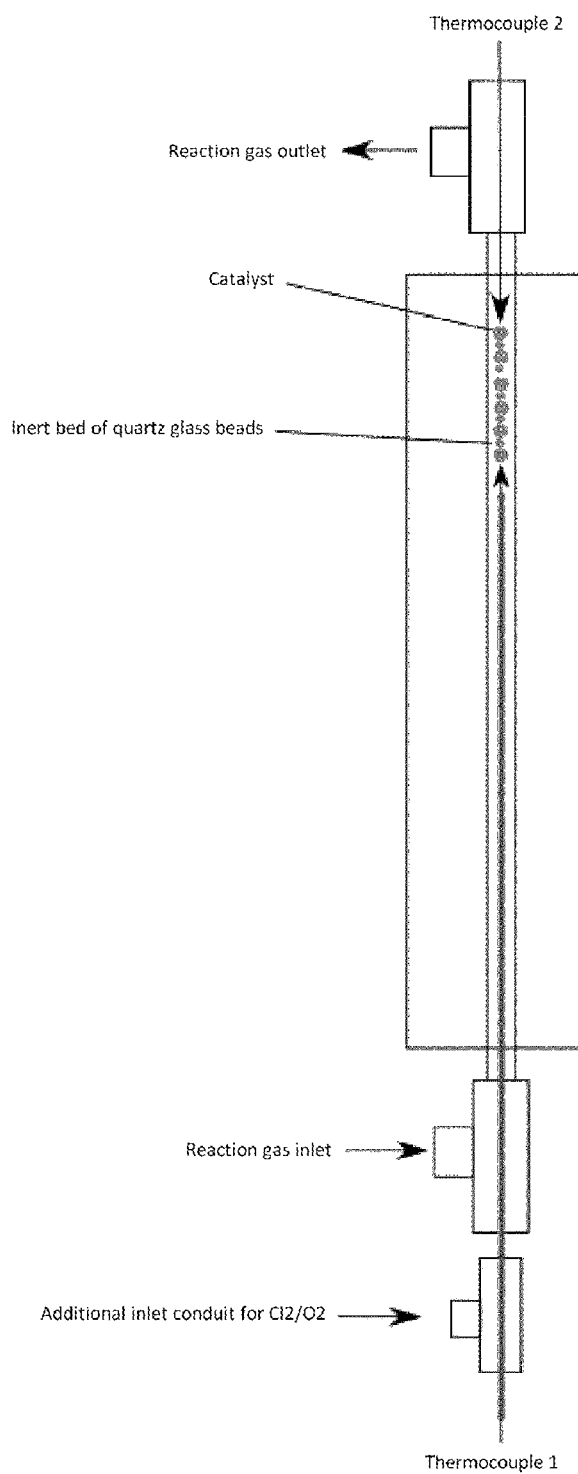
FIG. 1 shows a schematic of the reactor used for phosgene synthesis in the examples (laboratory monoliner reactor).

The influence of $ClO_2$ on the heterogeneously catalyzed phosgene synthesis in the presence of activated carbon catalyst was examined in a laboratory monoliner reactor (see FIG. 1) with a reaction tube having an internal diameter of 5.4 mm. The reaction tube is positioned in a copper block and its temperature is controlled thereby. The activated carbon catalyst used was commercially available activated carbon of the Donaucarbon ED47 type, which was in the form of extrudates (average diameter 4 mm, length 5 to 20 mm) and was positioned in the reaction tube with individual extrudates separated by inert glass beads. The total mass of catalyst was 0.8 g. The reaction tube was kept at a temperature of 100° C. and the pressure in the reactor was controlled at 5 bar absolute. The standard feed metered into the reactor was 15.9 l (STP)/h of CO and 14.6 l (STP)/h of $Cl_2$ from pressurized gas bottles via mass flow controllers. The gases flowed through the reactor from the bottom upward and were analyzed for their CO content by means of IR spectroscopy at the exit after expansion to an ambient pressure. The CO content in the gas stream at the reactant outlet (product gas) based on the CO content in the feed is a measure of CO conversion by formation of phosgene from the reaction with chlorine.

A further stream of 5 l (STP)/h is added in each case to the abovementioned standard feed, which is pure nitrogen (=reference feed 1) or a $ClO_2$-containing feed (=$ClO_2$ feed) or an $O_2$-containing feed (=reference feed 2).

In example 1, the $ClO_2$ feed was provided by guiding 5 l (STP)/h of a test gas (0.1% by volume of $Cl_2$, 99.9% $N_2$) through a preliminary reactor filled with $NaClO_2$, and in this way a $ClO_2$-containing feed having a maximum of 0.2% by volume of $ClO_2$ (in the case of full conversion) was produced by the method of Derby and Hutchinson. The $ClO_2$ content was 685 ppm by volume based on the chlorine feed stream.

In order to show the particular deactivating effect of $ClO_2$ compared to $O_2$, in example 2, an $O_2$-containing feed (reference feed 2) of 5 l (STP)/h of a test gas (0.2% by volume of $O_2$, 99.8% by volume of $N_2$) was metered into the experimental reactor. The oxygen content of the reference feed 2 corresponds to the $ClO_2$ content of the $ClO_2$-containing feed.

Example 1

Figure 2:
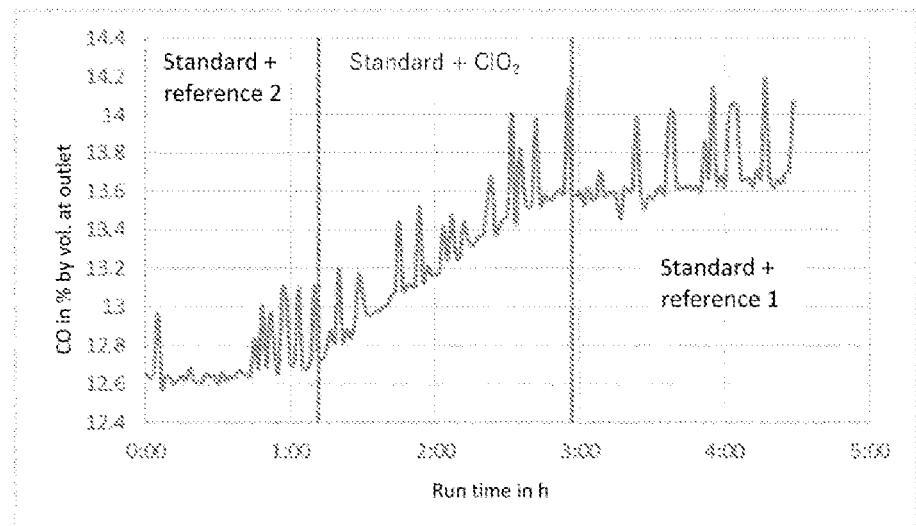
FIG. 2 shows the progression of the CO concentration at the reactor outlet against time in example 1, where the $ClO_2$ content is 685 ppm by volume based on the chlorine feed stream.
Figure 3:
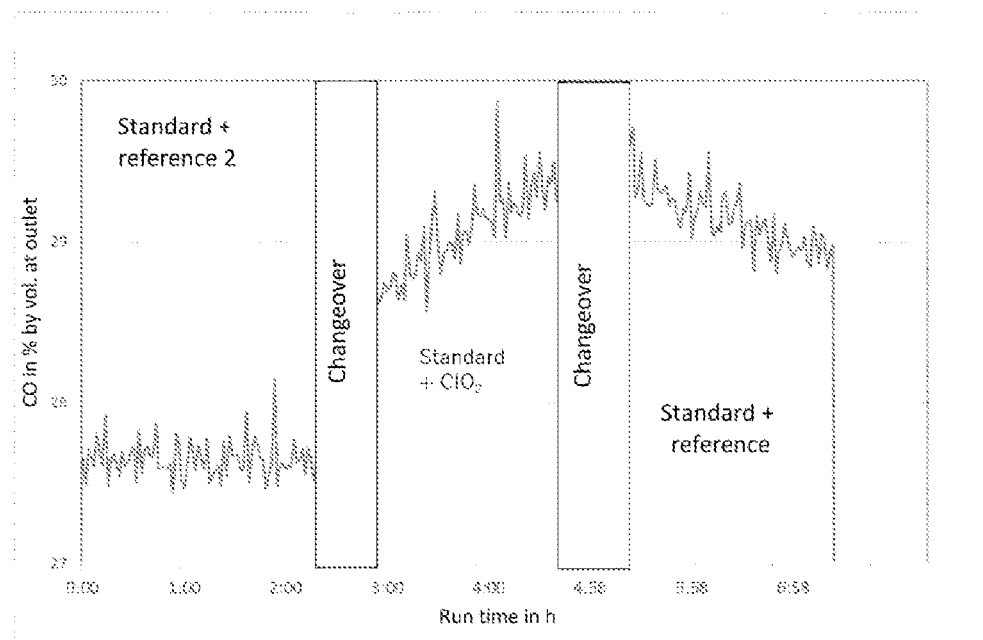
FIG. 3 shows the progression of the CO concentration at the reactor outlet against time in example 2, where the $O_2$ content is 685 ppm by volume based on the chlorine feed stream.

The above-described plant was first started up with the standard feed and additionally reference feed 1, and temperature and pressure were adjusted. The CO concentration at the reactor outlet (see FIG. 2) was 12.7% by volume at first, corresponding to a conversion of about 82%. After a little more than 1 hour, the gas feed stream in the reactor was switched to standard feed and additionally the $ClO_2$-containing feed. There is a clear continuous rise in the CO concentration to up to 13.6% by volume, corresponding to a decline in the conversion from 82% to 80.6%. The presence of $ClO_2$ leads to deactivation of the catalyst. This deactivation is found to be irreversible since switching back to standard feed and additionally reference feed 1 did not bring any recovery in the CO conversion after about 3 hours.

Example 2

This experiment was conducted analogously to example 1, except that reference feed 1 was replaced by reference feed 2 ($O_2$-containing feed). In addition, an already partly deactivated catalyst was used here. The intention here was to show that the deactivating effect observed in example 1 does indeed result from $ClO_2$ and not from oxygen released from the cleavage of the $ClO_2$. The intention was also to show that this effect also occurs in the case of an already aged catalyst. The plant was first started up with the standard feed and additionally reference feed 2, and temperature and pressure were adjusted. The CO concentration at the outlet was about 27.6% by volume of CO, corresponding to a CO conversion of 53%. Compared to example 1 with more than 80% conversion, the partial deactivation of the catalyst was shown. After about 2.5 hours, the gas feed stream in the reactor was switched to standard feed and additionally the $ClO_2$-containing feed. There was first a sharp rise here in the CO concentration in the product gas stream, followed by a continuous rise to up to 29.5% by volume of CO after a run time of about two hours. The rise in concentration corresponds to a decrease in the CO conversion to about 48.4%. After changing over again to standard feed and additionally reference feed 2, there was a slight recovery in the CO conversion, but the level before the reaction with $ClO_2$ was not reached again and it settled out at 29% by volume of CO, corresponding to a conversion of 49.6%.

Result:

Even at a $ClO_2$ content of 685 ppm by volume, based on the chlorine feed stream at a temperature of 100° C., a distinct decrease in catalyst activity and a decline in conversion was manifested within a very short time.

Comparative experiments with an oxygen content of 685 ppm by volume, based on the chlorine feed stream, did not show any deactivation of the activated carbon catalyst.

Example 3

The above-described plant was first started up with the standard feed and additionally reference feed 1 of 5 l (STP) of nitrogen/h, and temperature and pressure were adjusted.

Figure 4:
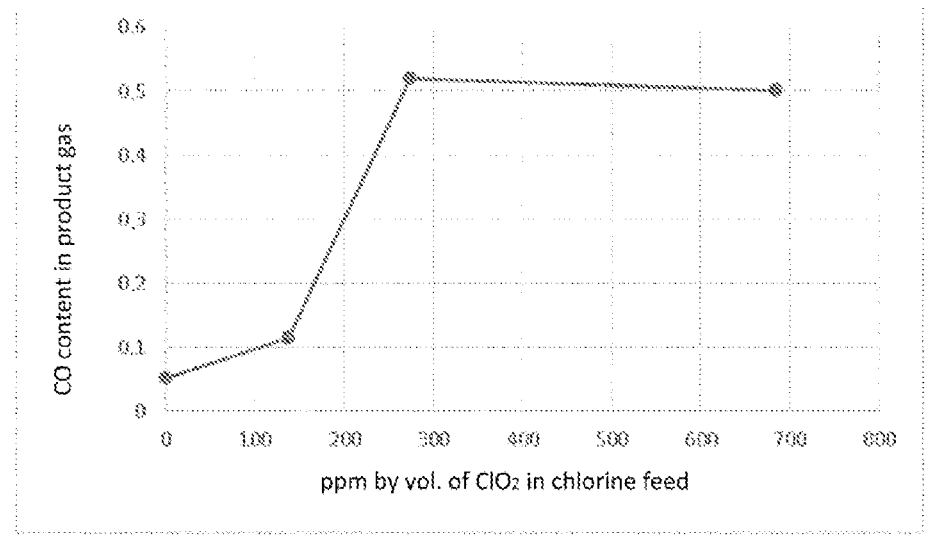
FIG. 4 shows the rate at which the CO concentration rises in the gas stream at the reactor outlet (product gas) as a function of the $ClO_2$ content in the chlorine feed stream.

Subsequently, the content of $ClO_2$ in the chlorine feed stream was increased stepwise. For this purpose, nitrogen in the reference feed was partly replaced by $ClO_2$-containing feed. FIG. 4 shows the rate at which the CO concentration rises in the gas stream at the reactor outlet (product gas) as a function of the $ClO_2$ content at the inlet, calculated for the chlorine feed stream. Over and above a $ClO_2$ content in the feed of more than 130 ppm, a much faster decrease in the CO conversion (and hence a faster rise in CO in the product gas) was observed.

Figure 5:
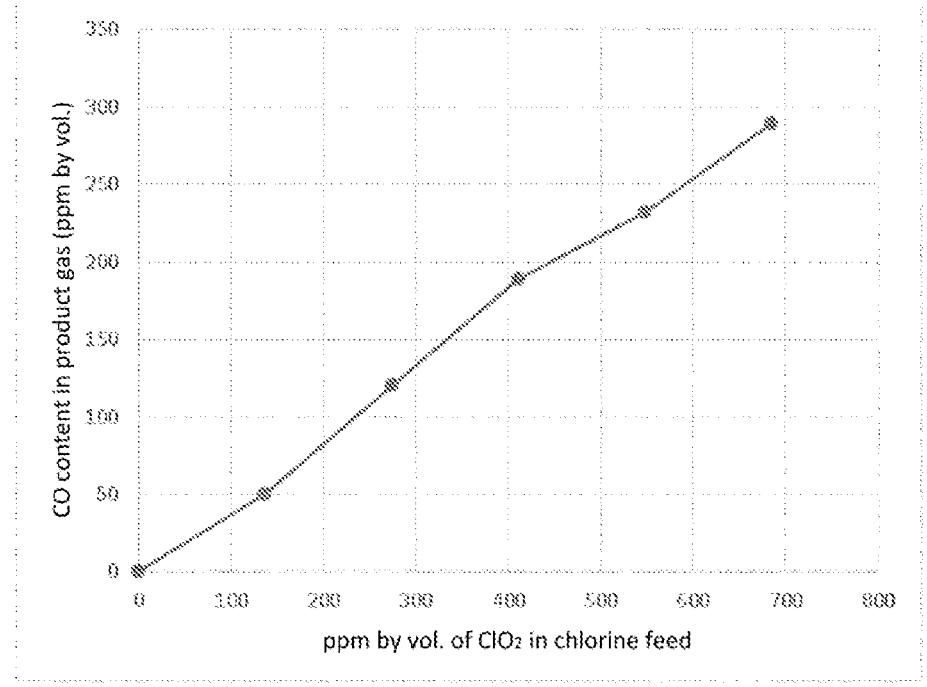
FIG. 5 shows the rate at which the $CO_2$ concentration rises in the gas stream at the reactor outlet (product gas) as a function of the $ClO_2$ content in the chlorine feed stream.

In the experiments, the $CO_2$ concentration in the gas stream was additionally measured by means of calibrated IR at the reactor outlet (product gas). As can be inferred from FIG. 5, the values show a distinct rise in $CO_2$ formation with rising $ClO_2$ content in the chlorine feed stream. In comparative experiments without catalyst, it was not possible to detect $CO_2$ formation, and so a possible carbon source for $CO_2$ formation is the activated carbon used as catalyst.

Therefore, an increasing amount of $ClO_2$ in the chlorine feed stream leads to a distinct increase in $CO_2$ formation by reaction of the activated oxygen with the activated carbon. One possible explanation for the decrease in the CO conversion would thus be the decreasing activity of the activated catalyst.

The invention claimed is:

1. A process for preparing phosgene comprising
a) providing a chlorine feed stream having a content of chlorine oxides of not more than 130 ppm by volume, wherein
i) chlorine is prepared by electrolyzing an aqueous solution of sodium chloride under conditions under which chlorine is obtained with a chlorine oxide content of not more than 130 ppm by volume, or
ii) chlorine having a chlorine oxide of more than 130 ppm by volume is subjected to a workup by which the content of chlorine oxides is reduced to a value of not more than 130 ppm by volume, or
iii) a first chlorine gas stream having a chlorine oxide content of more than 130 ppm by volume is mixed with a second chlorine gas stream having a chlorine oxide content of less than 130 ppm by volume in such a ratio as to result in a chlorine feed stream having a content of chlorine oxides of not more than 130 ppm by volume, or
iv) the chlorine is prepared by using a process other than the electrolysis of an aqueous solution of sodium chloride in which chlorine with a chlorine oxide content of not more than 130 ppm by volume is obtained,
b) subjecting the chlorine feed stream provided in step a) to a catalytic reaction with carbon monoxide over an activated carbon catalyst in at least one reactor.

2. The process according to claim 1, wherein, in i),
i1) an aqueous stream having a reduced sodium chloride content and an elevated sodium chlorate content compared to the aqueous sodium chloride solution supplied to the anode chamber is withdrawn from the anode chamber of the electrolysis cell used for electrolysis of the aqueous sodium chloride solution,
i2) the aqueous stream withdrawn from the anode chamber is partly or fully discharged, or at least a portion of the sodium chlorate present is removed from the aqueous stream withdrawn from the anode chamber, and
i3) the sodium chloride content of the portion of the aqueous stream withdrawn from the anode chamber that was not discharged in step i2) is increased and it is recycled into the anode chamber.

3. The process according to claim 2, wherein, in i2), at least a portion of the sodium chlorate present in the aqueous stream withdrawn from the anode chamber is removed by admixing the stream with acid.

4. The process according to claim 2, wherein at least a portion of the aqueous stream withdrawn from the anode chamber is subjected to a treatment to reduce the content of chlorine oxides present therein by UV irradiation.

5. The process according to claim 1, wherein, in ii), the chlorine, for workup, is subjected to a thermal, chemical catalytic, or photochemical treatment, to obtain a chlorine feed stream having a content of chlorine oxides of not more than 130 ppm by volume.

6. The process according to claim 1, wherein chlorine prepared by HCl electrolysis, Deacon process or the KEL chlorine process is used as second chlorine gas stream in step iii), or wherein chlorine prepared by HCl electrolysis, Deacon process or the KEL chlorine process is used in step iv).

7. The process according to claim 1, wherein the chlorine oxide comprises chlorine dioxide or consists of chlorine dioxide.

8. The process according to claim 1, wherein the phosgene synthesis is conducted in at least one shell and tube reactor with activated carbon catalyst present in the tubes thereof.

9. The process according to claim 1, wherein the phosgene synthesis is effected in at least one shell and tube reactor, and the reactor tubes are cooled by contacting with a liquid heat carrier or by means of evaporative cooling.

10. The process according to claim 9, wherein cooling is effected using a liquid heat carrier which is guided in cocurrent or in countercurrent to the flow direction of the gases reacting in the reactor tubes.

11. The process according to claim 9, wherein the shell and tube reactor has a shell space through which the heat carrier flows, and the shell space is divided into at least two zones that are supplied separately with liquid or boiling heat carrier for cooling.

12. The process according to claim 1, wherein the activated carbon used is prepared by pyrolysis of a natural raw material, wherein the activated carbon catalyst is in the form of spheres, cylindrical strands, platelets or rings.

13. A process for preparing phosgene as defined in claim 1, using an apparatus for preparation of phosgene, comprising:
a unit for reducing the chlorine oxide content in a chlorine oxide-containing chlorine feed stream having an inlet for the chlorine feed stream and an outlet for the chlorine oxide-depleted chlorine feed stream, and
a shell and tube reactor with reactor tubes containing an activated carbon catalyst bed, wherein the shell and tube reactor has an inlet for the chlorine oxide-depleted chlorine feed stream and an outlet for a phosgene-containing product stream, wherein the chlorine oxide-depleted chlorine feed stream is mixed with a carbon monoxide feed stream before entering the shell and tube reactor;
wherein the chlorine oxide content in the chlorine feed stream is determined and the temperature of the chlorine feed stream is controlled as a function of the chlorine oxide content such that the content of chlorine oxides at the inlet to the phosgene reactor is not more than 130 ppm by volume.

* * * * *